United States Patent [19]
Savolainen et al.

[11] 3,805,373
[45] Apr. 23, 1974

[54] METHOD OF MAKING A BRAZED COMPOSITE METAL TAPE

[75] Inventors: Unto U. Savolainen; Larry D. Overton, both of Attleboro, Mass.

[73] Assignee: Texas Instruments Incorporated, Dallas, Tex.

[22] Filed: July 31, 1972

[21] Appl. No.: 276,876

[52] U.S. Cl.................... 29/482, 29/472.1, 29/501, 29/503
[51] Int. Cl............................................. B23k 31/02
[58] Field of Search .......... 29/472.1, 482, 489, 501, 29/475, 503

[56] References Cited
UNITED STATES PATENTS

| | | | |
|---|---|---|---|
| 1,155,426 | 10/1915 | Liebmann et al................. | 29/501 X |
| 1,939,467 | 12/1933 | Short et al. ...................... | 29/501 X |
| 2,040,092 | 5/1936 | Leedy.............................. | 29/501 X |
| 2,451,099 | 10/1948 | LaMotte........................ | 29/472.1 X |
| 3,200,489 | 8/1965 | Keeleric........................... | 29/482 X |
| 3,500,538 | 3/1970 | Raciti.............................. | 29/489 X |

Primary Examiner—Richard B. Lazarus
Attorney, Agent, or Firm—Harold Levine; John A. Haug; James P. McAndrews

[57] ABSTRACT

A brazed composite metal tape characterized by improved strength and flexibility, by more precisely controlled tape thickness, and particularly by improved braze quality comprises a first metal strip having a multiplicity of integral protrusions upstanding from one surface of the strip, these protrusions being arranged in spaced relation to each other preferably in a pattern over a central band extending longitudinally along the length of the strip, a second metal strip juxtaposed to the first metal strip and spaced from the first strip by engagement with said protrusions, and a brazing material disposed between the metal strips around the protrusions bonding the strips together. The first metal strip is knurled to provide the noted protrusions from one surface of the first strip and the second strip is engaged with the tips of the protrusions while molten brazing material is flowed between the strips, or while solid brazing material is disposed between the strips and melted, for bonding the strips to each other.

5 Claims, 4 Drawing Figures

METHOD OF MAKING A BRAZED COMPOSITE METAL TAPE

Brazed composite metal tapes, such as tape having layers of precious metal brazed to base metal layers, arecommonly advanced through machine tools wherein various blanking and other operations are performed for producing a series of electrical contact members or the like from the tapes. In forming such tapes it is desirable that the thickness of the brazing material between metal layers of the tapes be very precisely controlled so that the tapes display uniform thickness throughout their lengths. For the best brazes, the thickness of the braze material should also be very small. In making such brazed tapes it is also desirable to provide strong brazes and to assure that unbrazed portions or voids between the strips in the composite tapes are kept to a minimum. On the other hand, it is desirable that the brazing material used in the tapes be reasonably ductile to permit the tapes to be flexed as they are advanced through machine tools in making the electrical contact members. In the prior art, some difficulty has been encountered in assuring constant thickness of the braze layer in such composite metal tapes, particularly where the thickness of the braze layer is intended to be quite small. Even great diffuclty has been encountered in avoiding unbrazed portions or voids between the strip materials in the composite tapes. It is also difficult to achieve a braze which provides the desired combination of strength and ductility.

It is an object of this invention to provide a novel and improved brazed composite metal tape; to provide such a tape which displays improved strength and flexibility while also displaying improved uniformity of braze thickness along the length of the tape and while displaying improved continuity of the braze between the strip materials embodied in the tape; and to provide novel and improved methods for making such composite metal tapes in a convennient and inexpensive manner.

Other objects, advantages and details of the brazed composite metal tapes and methods of this invention appear in the following detailed description of preferred embodiments of the inventions, the description referring to the drawings in which.

Figure 1:
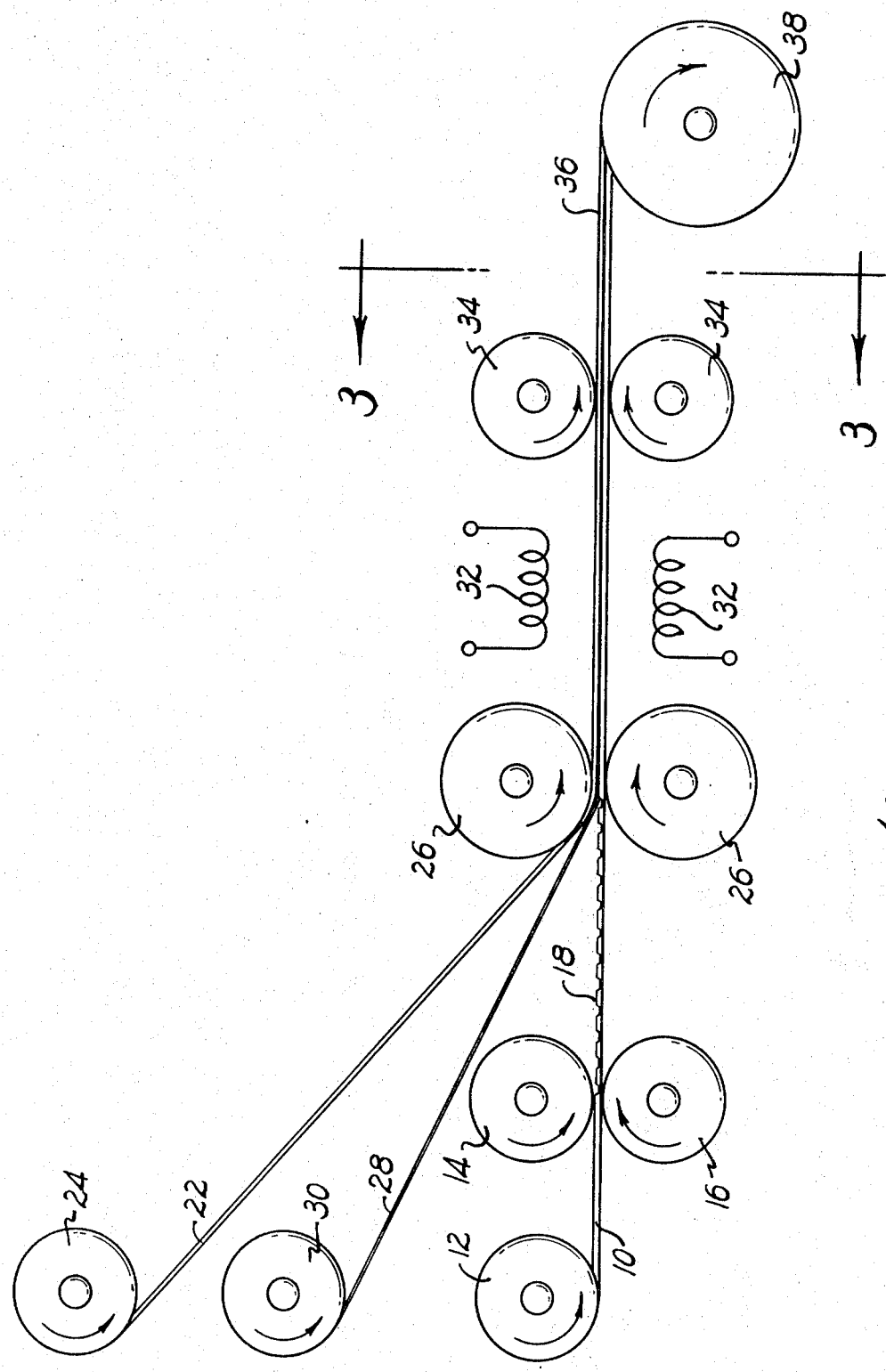
FIG. 1 is a diagrammatic view illustrating a preferred embodiment of the method of composite tape manufacture provided by this invention.
Figure 2:
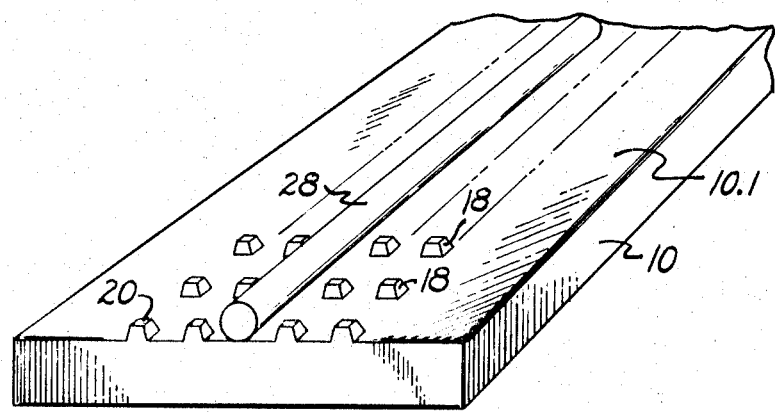
FIG. 2 is a partial perspective view of a metal strip partially processed according to this invention for use in manufacture of a brazed composite metal tape.
Figure 3:
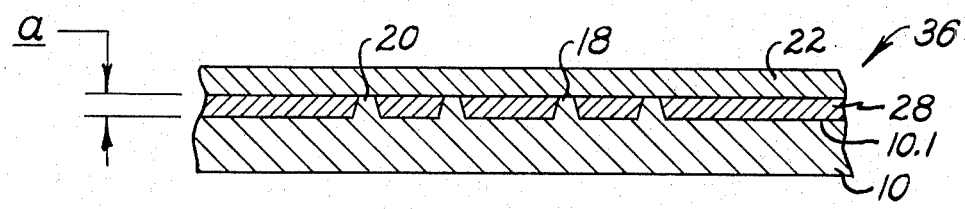
FIG. 3 is a section view transversely across the longitudinal axis of a brazed composite metal tape provided by this invention.

Referring to the drawings, 10 in FIGS. 1–3 indicates a first relatively long, thin and narrow strip of metal, preferably of a precious metal material such as gold or silver or the like. This metal strip 10 is advanced from a pay-off reel 12 to pass between a knurling roll 14 and a smooth back-up roll 16. The knurling tool 14 is of any conventional type adapted to knurl or form a multiplicity of integral protrusions 18 in spaced relation to each other upstanding from the strip surface 10.1. See FIGS. 1 and 2. In this regard, the term "knurl" is used herein to identify the known process for forming protrusions on a surface of a metal member by applying pressure to the surface, or by applying pressure to the surface while the surface is being cut at spaced locations, by means of a tool to cause metal material to be forced up from the surface into recesses provided in the tool, thereby to form the desired protrusions from the surface without requiring indentation of an opposite surface of the member.

In one embodiment of this invention, the width of the knurling tool 14 is selected to be less than the width of the metal strip 10 so that, as is best illustrated in FIG. 2, the protrusions 18 formed in the strip surface 10.1 are disposed in spaced relation to each other in a pattern over a limited central band portion of the strip surface 10.1 extending longitudinally along the length of the strip 10. Alternately the protrusions 18 are formed in a pattern which substantially covers the strip surface 10.1. The individual protrusions 18 formed by the knurling are of any desired configuration such as the four-sided, truncated pyramidal shape shown in FIG. 2 and preferably the tool 14 is proportioned in a conventional way to assure that each of the protrusions 18 is of substantially the same selected height above the surface 10.1 of the metal strip. Preferably also, the individual protrusions 18 do not extend acros the entire surface of the strip 10 or across the noted central board portion of the strip surface. Desirably, for example, the knurling roll 1r is proportioned to form protrusions 18 of generally columnar shape as shown having flattened or rounded tips 20, the protrusions having the same selected height of about 0.001 to 0.010 inches above the strip surface 10.1.

In accordance with the preferred embodiment of the method of this invention, a second strip of metal 22 is advanced from a pay-off reel 24 and is brought together with the metal strip 10 between a pair of guide rolls 26. Preferably, for example, the metal strip 22 is formed of a base metal such as copper, nickel, cupronickel or steel or the like, this base metal strip being engaged with the tips 20 of the protrusions 18 on the strip 10 for precisely positioning the metal strip 22 in juxtaposed relation to the strip 10 and spaced at a precise distance from the strip surface 10.1. As will be understood, any conventional lateral guide means (not shown) are employed for advancing the strips 10 and 22 in the desired longitudinally aligned relationship to each other. As will also be understood, the strip 10 is usually of the same or narrower width than the strip 22 as desired.

In accordance with this invention, a length of metal brazing material 28 is advanced from its pay-off reel 30 to be brought between the strips 10 and 22 at the guide rolls 26, this brazing material preferably comprising a relatively ductile brazing alloy such as the alloy comprising 52 percent silver, 16 percent copper, 15 percent zinc, and 17 percent cadmium by weight. This length 28 of brazing material may be provided in the form of a foil which is trapped between the metal strip 22 and the tips of the protrusions 18 on the metal strip 10 but more desirably, as is best shown in FIG. 2, the brazing material 28 is advanced in the form of a wire and is guided between the metal strips 10 and 22 between protrusions 18 formed on the strip 10, the wire diameter being selected to assure the appropriate volume of brazing material necessary to form the desired braze thickness between the metal strip 10 and 22. As will be understood, several wires of brazing material can be advanced between the strips 10 and 22 where desired to provide the desired volume of brazing material.

In accordance with this invention, the metal strips 10 and 22 are advanced with the length of brazing material 18 past any conventional heating means such as are diagrammatically illustrated by the heating coil means 32 in FIG. 1 for heating the strip materials and the brazing material to melt the brazing material. The protrusions 18 formed on the strip 10 provide the desired small spacing of the strip 22 from the surface 10.1 of the base metal strip so that the molten brazing material 28 is drawn by capillary action into contact with the entire areas of the juxtaposed surfaces of the strips 10 and 22 around the protrusions 18. The brazing material is then cooled, preferably while the strips 10 and 22 are pressed lightly together by a pair of pressure rolls 34 or the like, to bond the metal strips 10 and 22 to each other to form a brazed composite metal tap 36, this tape then being coiled on the driven take-up reel 38 as shown in FIG. 1.

In this arrangement, the engagement of the strip 22 with the tips of the protrusions 18 assures formation of a composite tape 36 having a braze thickness $a$ as shown in FIG. 3 which is substantially controlled and uniform throughout the length of the tape. As the individual protrusions 18 preferably do not extend across the entire width of the braze 28, the braze material readily flows around the protrusions to contact all juxtaposed surfaces of the strips 10 and 22. Where the tips 20 of the protrusions 18 are flat or rounded, the pressure applied by the rolls 34 does not tend to establish points of excessive stress in the metal strip 22 or to irregularly flatten the protrusions against the strip 22. Further, where the protrusions 18 are located as shown in FIG. 3 at the central portion of the braze, and where the braze material 28 is reasonably ductile, the protrusions 18 effectively reinforce the central portion of the braze to provide a high strength braze while the edges of the braze are reasonably ductile and do not tend to crack during flexing of the tape 36. Of course, the presence of the protrusions 18 within the tape braze, increase the surface area adhesion to the metal strip 10 for also increasing the strength of the tape braze. It is also found that the use of the protrusions 18 tends to assure more uniform distribution of the braze material 28 between the strips 10 and 22 to minimize the occurrence of unbrazed portions or voids between the strips 10 and 22.

In a typical embodiment of this invention, for example, the metal strips 10 and 22 are formed of gold and nickel respectively, and have the same width of about 1.00 inches, the strip 10 having a thickness of about 0.005 inches and the strip 22 a thickness of about 0.030 inches. The strip 10 is knurled along a central band comprising about one-third of the width of the strip with the base of the protrusions 18 covering about one-third of the total area of this central band, the individual protrusions preferably having a height of about 0.002 inches above the strip surface 10.1. A length of brazing material 28 in wire form, preferably of the reasonably ductile alloy specifically described above, is then advanced between the strips as illustrated in FIG. 2 and is melted and cooled between the strips while the strips are pressed lightly together by the rolls 34. In this procedure, the tape 36 as above-described is found to display increased strength in combination with a desired degree of tape flexibility while displaying improved uniformity of tape thickness throughout its length and while assuring very high degree of braze continuity with minimum occurrence of unbrazed portions between the strips 10 and 22 and with substantial elimination of large unbrazed portions between these strips.

Figure 4:
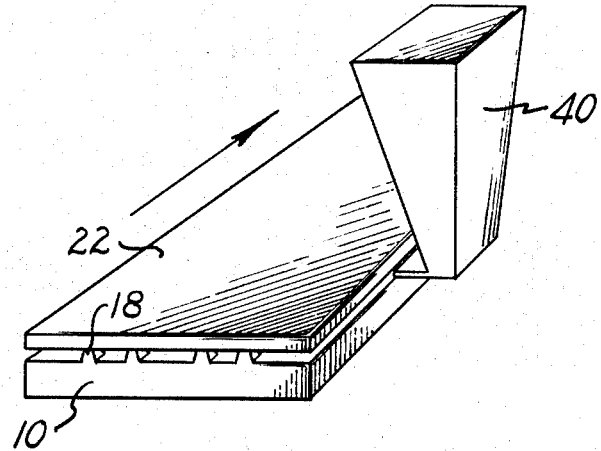
FIG. 4 is a diagrammatic view similar to FIG. 1 illustrating an alternate embodiment of the method of this invention.

It will be understood that the method above-disclosed is adapted to be varied in a number of ways within the scope of this invention. For example, the melting of the length of braze material 28 between the strips 10 and 22 can be omitted and a molten braze material can be flowed between he metal strips 10 and 22 from a hopper 40 as is illustrated in FIG. 4, the method of tape manufacture being otherwise as described with reference to FIGS. 1–3. Further, a plurality of knurling rolls 14 can be utilized to provide a plurality of knurled bands along the length of the metal strip 10. Alternately, the guide rolls 30 and pressure rolls 34 can be replaced with graphite slide members of the like and the electric heating coils 32 can be replaced with gas furnace means or the like. Further, the composite tape 36 can be provided with three layers as shown in FIG. 3 or with five or more layers as will be understood. Further, where the material 28 is described as brazing material between the metal layers of the tape 35, it will be understood that the term "layer" also includes the term "solder" and that any conventional solder material can also be used between the metal layer of the composite tape. Further, although the protrusions 18 are shown to be formed on the precious metal strip of the composite tape material, these protrusions could alternately be formed on the base metal strip material on the composite tape. It should be understood that this invention includes all modifications and equivalents of the disclosed embodiments of the invention which fall within the scope of the appended claims.

We claim:

1. A method for making an accurately dimensioned brazed composite metal tape comprising the steps of progressively knurling a surface of a first, relatively long, thin and narrow strip of metal longitudinally thereof for forming a multiplicity of integral protrusions of selected height upstanding from said strip surface, progressively juxtaposing a second, relatively long, thin and narrow strip of metal to said first strip surface in engagement with said protrusions for spacing said second strip at a selected distance from said first strip surface, and progressively cooling molten brazing material between said strips around said protrusions for bonding said strips together spaced at said selected distance to form a brazed composite metal tape having a precisely predetermined tape thickness.

2. A method as set forth in claim 1 wherein said brazing material is progressively melted and flowed between said second strip has been engaged with said protrusions on said first strip surface.

3. A method as set forth in claim 1 wherein a length of brazing material is progressively disposed between said method strips in solid form as said strips are progressively juxtaposed to each other and is progressively melted and cooled between said strips for bonding said strips to each other.

4. A method as set forth in claim 1 wherein said protrusions are formed with a height in the range from 0.001 to 0.010 inches above said first strip surface so that, when said second strip is engaged with said protrusions, said brazing material is drawn into contact with the juxtaposed surfaces of said strips by capillary action for bonding said strips to each other.

5. A method as set forth in claim 4 wherein said protrusions are formed on a limited bond of said first surface extending longitudinally along the length of said strip surface.

* * * * *